US008214175B2

(12) United States Patent
Moskowitz et al.

(10) Patent No.: US 8,214,175 B2
(45) Date of Patent: Jul. 3, 2012

(54) METHOD AND DEVICE FOR MONITORING AND ANALYZING SIGNALS

(75) Inventors: Scott Moskowitz, Sunny Isles Beach, FL (US); Mike W. Berry, Seattle, WA (US)

(73) Assignee: Blue Spike, Inc., Sunny Isles Beach, FL (US)

( * ) Notice: Subject to any disclaimer, the term of this patent is extended or adjusted under 35 U.S.C. 154(b) by 0 days.

(21) Appl. No.: 13/035,964

(22) Filed: Feb. 26, 2011

(65) Prior Publication Data

US 2011/0179069 A1    Jul. 21, 2011

Related U.S. Application Data

(63) Continuation of application No. 12/655,357, filed on Dec. 22, 2009, now Pat. No. 7,949,494, which is a continuation of application No. 12/005,229, filed on Dec. 26, 2007, now Pat. No. 7,660,700, which is a continuation of application No. 09/657,181, filed on Sep. 7, 2000, now Pat. No. 7,346,472.

(51) Int. Cl.
G06F 11/30    (2006.01)

(52) U.S. Cl. ........ 702/182; 704/201; 704/219; 341/155; 341/76; 341/61

(58) Field of Classification Search .......... 702/182; 704/201, 204, 211, 270, 219, 500, 503, 504; 341/155, 76, 61
See application file for complete search history.

(56) References Cited

U.S. PATENT DOCUMENTS

| 3,947,825 A | 3/1976 | Cassada |
| 3,984,624 A | 10/1976 | Waggener |
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,390,898 A | 6/1983 | Bond et al. |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |
| 4,748,668 A | 5/1988 | Shamir et al. |
| 4,789,928 A | 12/1988 | Fujisaki |
| 4,827,508 A | 5/1989 | Shear |
| 4,876,617 A | 10/1989 | Best et al. |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Jones et al. |
| 4,972,471 A | 11/1990 | Gross et al. |
| 4,977,594 A | 12/1990 | Shear |
| 4,979,210 A | 12/1990 | Nagata et al. |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,111,530 A * | 5/1992 | Kutaragi et al. .............. 704/270 |
| 5,113,437 A | 5/1992 | Best et al. |
| 5,136,581 A | 8/1992 | Muehrcke |
| 5,136,646 A | 8/1992 | Haber et al. |
| 5,136,647 A | 8/1992 | Haber et al. |
| 5,142,576 A | 8/1992 | Nadan |
| 5,161,210 A | 11/1992 | Druyvesteyn et al. |
| 5,210,820 A | 5/1993 | Kenyon |
| 5,243,423 A | 9/1993 | DeJean et al. |
| 5,243,515 A | 9/1993 | Lee |
| 5,287,407 A | 2/1994 | Holmes |
| 5,319,735 A | 6/1994 | Preuss et al. |
| 5,327,520 A * | 7/1994 | Chen ............................ 704/219 |
| 5,341,429 A | 8/1994 | Stringer et al. |
| 5,341,477 A | 8/1994 | Pitkin et al. |
| 5,363,448 A | 11/1994 | Koopman et al. |
| 5,365,586 A | 11/1994 | Indeck et al. |
| 5,369,707 A | 11/1994 | Follendore, III |
| 5,379,345 A | 1/1995 | Greenberg |
| 5,394,324 A | 2/1995 | Clearwater |

(Continued)

FOREIGN PATENT DOCUMENTS

EP    0372601    6/1990

(Continued)

OTHER PUBLICATIONS

Jap. App. No. 2000-542907, entitled "Multiple Transform Utilization and Application for Secure Digital Watermarking"; which is a JP national stage of PCT/US1999/007262, published as WO/1999/052271, Oct. 14, 1999.
PCT Application No. PCT/US00/21189, filed Aug. 4, 2000, entitled, "A Secure Personal Content Server", Pub. No. WO/2001/018628 ; Publication Date Mar. 15, 2001.
EPO Application No. 96919405.9, entitled "Steganographic Method and Device"; published as EP0872073 (A2), Oct. 21, 1998.
Schneier, Bruce, Applied Cryptography, 2nd Ed., John Wiley & Sons, pp. 9-10, 1996.
Menezes, Alfred J., Handbook of Applied Cryptography, CRC Press, p. 46, 1997.
1997, Merriam-Webster's Collegiate Dictionary, 10th Ed., Merriam Webster, Inc., p. 207.

(Continued)

Primary Examiner — Carol Tsai
(74) Attorney, Agent, or Firm — Neifeld IP Law, PC

(57) ABSTRACT

A method and system for monitoring and analyzing at least one signal are disclosed. An abstract of at least one reference signal is generated and stored in a reference database. An abstract of a query signal to be analyzed is then generated so that the abstract of the query signal can be compared to the abstracts stored in the reference database for a match. The method and system may optionally be used to record information about the query signals, the number of matches recorded, and other useful information about the query signals. Moreover, the method by which abstracts are generated can be programmable based upon selectable criteria. The system can also be programmed with error control software so as to avoid the re-occurrence of a query signal that matches more than one signal stored in the reference database.

19 Claims, No Drawings

U.S. PATENT DOCUMENTS

| | | | |
|---|---|---|---|
| 5,398,285 A | 3/1995 | Borgelt et al. | |
| 5,406,627 A | 4/1995 | Thompson et al. | |
| 5,408,505 A | 4/1995 | Indeck et al. | |
| 5,410,598 A | 4/1995 | Shear | |
| 5,412,718 A | 5/1995 | Narasimhalv et al. | |
| 5,418,713 A | 5/1995 | Allen | |
| 5,428,606 A | 6/1995 | Moskowitz | |
| 5,450,490 A | 9/1995 | Jensen et al. | |
| 5,469,536 A | 11/1995 | Blank | |
| 5,471,533 A | 11/1995 | Wang et al. | |
| 5,478,990 A | 12/1995 | Montanari et al. | |
| 5,479,210 A | 12/1995 | Cawley et al. | |
| 5,487,168 A | 1/1996 | Geiner et al. | |
| 5,493,677 A | 2/1996 | Balogh et al. | |
| 5,497,419 A | 3/1996 | Hill | |
| 5,506,795 A | 4/1996 | Yamakawa | |
| 5,513,126 A | 4/1996 | Harkins et al. | |
| 5,513,261 A | 4/1996 | Maher | |
| 5,530,739 A | 6/1996 | Okada | |
| 5,530,751 A | 6/1996 | Morris | |
| 5,530,759 A | 6/1996 | Braudaway et al. | |
| 5,539,735 A | 7/1996 | Moskowitz | |
| 5,548,579 A | 8/1996 | Lebrun et al. | |
| 5,568,570 A | 10/1996 | Rabbani | |
| 5,579,124 A | 11/1996 | Aijala et al. | |
| 5,581,703 A | 12/1996 | Baugher et al. | |
| 5,583,488 A | 12/1996 | Sala et al. | |
| 5,598,470 A | 1/1997 | Cooper et al. | |
| 5,606,609 A | 2/1997 | Houser et al. | |
| 5,613,004 A | 3/1997 | Cooperman et al. | |
| 5,617,119 A | 4/1997 | Briggs et al. | |
| 5,617,506 A * | 4/1997 | Burk et al. | 704/201 |
| 5,625,690 A | 4/1997 | Michel et al. | |
| 5,629,980 A | 5/1997 | Stefik et al. | |
| 5,633,932 A | 5/1997 | Davis et al. | |
| 5,634,040 A | 5/1997 | Her et al. | |
| 5,636,276 A | 6/1997 | Brugger | |
| 5,636,292 A | 6/1997 | Rhoads | |
| 5,640,569 A | 6/1997 | Miller et al. | |
| 5,646,997 A | 7/1997 | Barton | |
| 5,657,461 A | 8/1997 | Harkins et al. | |
| 5,659,726 A | 8/1997 | Sandford, II et al. | |
| 5,664,018 A | 9/1997 | Leighton | |
| 5,673,316 A | 9/1997 | Auerbach et al. | |
| 5,677,952 A | 10/1997 | Blakely et al. | |
| 5,680,462 A | 10/1997 | Miller et al. | |
| 5,687,236 A | 11/1997 | Moskowitz et al. | |
| 5,689,587 A | 11/1997 | Bender et al. | |
| 5,696,828 A | 12/1997 | Koopman, Jr. | |
| 5,719,937 A | 2/1998 | Warren et al. | |
| 5,721,788 A | 2/1998 | Powell et al. | |
| 5,734,752 A | 3/1998 | Knox | |
| 5,737,416 A | 4/1998 | Cooper et al. | |
| 5,737,733 A | 4/1998 | Eller | |
| 5,740,244 A | 4/1998 | Indeck et al. | |
| 5,745,569 A | 4/1998 | Moskowitz et al. | |
| 5,748,783 A | 5/1998 | Rhoads | |
| 5,751,811 A | 5/1998 | Magnotti et al. | |
| 5,754,697 A | 5/1998 | Fu et al. | |
| 5,757,923 A | 5/1998 | Koopman, Jr. | |
| 5,765,152 A | 6/1998 | Erickson | |
| 5,768,396 A | 6/1998 | Sone | |
| 5,774,452 A | 6/1998 | Wolosewicz | |
| 5,781,184 A * | 7/1998 | Wasserman et al. | 348/571 |
| 5,790,677 A | 8/1998 | Fox et al. | |
| 5,799,083 A | 8/1998 | Brothers et al. | |
| 5,809,139 A | 9/1998 | Grirod et al. | |
| 5,809,160 A | 9/1998 | Powell et al. | |
| 5,818,818 A | 10/1998 | Soumiya | |
| 5,822,432 A | 10/1998 | Moskowitz et al. | |
| 5,828,325 A | 10/1998 | Wolosewicz et al. | |
| 5,832,119 A | 11/1998 | Rhoads | |
| 5,839,100 A * | 11/1998 | Wegener | 704/220 |
| 5,842,213 A | 11/1998 | Odom | |
| 5,848,155 A | 12/1998 | Cox | |
| 5,850,481 A | 12/1998 | Rhoads | |
| 5,859,920 A | 1/1999 | Daly et al. | |
| 5,860,099 A | 1/1999 | Milios et al. | |
| 5,862,260 A | 1/1999 | Rhoads | |
| 5,870,474 A | 2/1999 | Wasilewski et al. | |
| 5,884,033 A | 3/1999 | Duvall et al. | |
| 5,889,868 A | 3/1999 | Moskowitz et al. | |
| 5,893,067 A | 4/1999 | Bender et al. | |
| 5,894,521 A | 4/1999 | Conley | |
| 5,901,178 A * | 5/1999 | Lee et al. | 375/240 |
| 5,903,721 A | 5/1999 | Sixtus | |
| 5,905,800 A | 5/1999 | Moskowitz et al. | |
| 5,905,975 A | 5/1999 | Ausubel | |
| 5,912,972 A | 6/1999 | Barton | |
| 5,915,027 A | 6/1999 | Cox et al. | |
| 5,917,915 A | 6/1999 | Hirose | |
| 5,918,223 A | 6/1999 | Blum | |
| 5,920,900 A | 7/1999 | Poole et al. | |
| 5,923,763 A | 7/1999 | Walker et al. | |
| 5,930,369 A | 7/1999 | Cox et al. | |
| 5,930,377 A | 7/1999 | Powell et al. | |
| 5,940,134 A | 8/1999 | Wirtz | |
| 5,943,422 A | 8/1999 | Van Wie et al. | |
| 5,949,055 A | 9/1999 | Fleet | |
| 5,963,909 A | 10/1999 | Warren et al. | |
| 5,973,731 A | 10/1999 | Schwab | |
| 5,974,141 A | 10/1999 | Saito | |
| 5,991,426 A | 11/1999 | Cox et al. | |
| 5,999,217 A | 12/1999 | Berners-Lee | |
| 6,009,176 A | 12/1999 | Gennaro et al. | |
| 6,029,126 A | 2/2000 | Malvar | |
| 6,041,316 A | 3/2000 | Allen | |
| 6,044,471 A | 3/2000 | Colvin | |
| 6,049,838 A | 4/2000 | Miller et al. | |
| 6,051,029 A | 4/2000 | Paterson et al. | |
| 6,061,793 A | 5/2000 | Tewfik et al. | |
| 6,067,622 A | 5/2000 | Moore | |
| 6,069,914 A | 5/2000 | Cox | |
| 6,078,664 A | 6/2000 | Moskowitz et al. | |
| 6,081,251 A | 6/2000 | Sakai et al. | |
| 6,081,587 A | 6/2000 | Reyes et al. | |
| 6,081,597 A | 6/2000 | Hoffstein | |
| 6,088,455 A | 7/2000 | Logan et al. | |
| 6,131,162 A | 10/2000 | Yoshiura et al. | |
| 6,141,753 A | 10/2000 | Zhao et al. | |
| 6,141,754 A | 10/2000 | Choy | |
| 6,148,333 A | 11/2000 | Guedalia | |
| 6,154,571 A | 11/2000 | Cox et al. | |
| 6,178,405 B1 * | 1/2001 | Ouyang et al. | 704/500 |
| 6,192,138 B1 | 2/2001 | Yamadaji | |
| 6,199,058 B1 | 3/2001 | Wong et al. | |
| 6,205,249 B1 | 3/2001 | Moskowitz | |
| 6,208,745 B1 | 3/2001 | Florenio et al. | |
| 6,226,618 B1 | 5/2001 | Downs | |
| 6,230,268 B1 | 5/2001 | Miwa et al. | |
| 6,233,347 B1 | 5/2001 | Chen et al. | |
| 6,233,684 B1 | 5/2001 | Stefik et al. | |
| 6,240,121 B1 | 5/2001 | Senoh | |
| 6,263,313 B1 | 7/2001 | Milstead et al. | |
| 6,272,634 B1 | 8/2001 | Tewfik et al. | |
| 6,275,988 B1 | 8/2001 | Nagashima et al. | |
| 6,278,780 B1 | 8/2001 | Shimada | |
| 6,278,791 B1 | 8/2001 | Honsinger et al. | |
| 6,282,300 B1 | 8/2001 | Bloom et al. | |
| 6,282,650 B1 | 8/2001 | Davis | |
| 6,285,775 B1 | 9/2001 | Wu et al. | |
| 6,301,663 B1 | 10/2001 | Kato et al. | |
| 6,310,962 B1 | 10/2001 | Chung et al. | |
| 6,330,335 B1 | 12/2001 | Rhoads | |
| 6,330,672 B1 | 12/2001 | Shur | |
| 6,345,100 B1 | 2/2002 | Levine | |
| 6,351,765 B1 | 2/2002 | Pietropaolo et al. | |
| 6,363,483 B1 | 3/2002 | Keshav | |
| 6,373,892 B1 | 4/2002 | Ichien et al. | |
| 6,373,960 B1 | 4/2002 | Conover et al. | |
| 6,374,036 B1 | 4/2002 | Ryan et al. | |
| 6,377,625 B1 | 4/2002 | Kim | |
| 6,381,618 B1 | 4/2002 | Jones et al. | |
| 6,381,747 B1 | 4/2002 | Wonfor et al. | |
| 6,385,324 B1 | 5/2002 | Koppen | |
| 6,385,329 B1 | 5/2002 | Sharma et al. | |
| 6,385,596 B1 | 5/2002 | Wiser | |

| Patent No. | Date | Inventor |
|---|---|---|
| 6,389,538 B1 | 5/2002 | Gruse et al. |
| 6,405,203 B1 | 6/2002 | Collart |
| 6,415,041 B1 | 7/2002 | Oami et al. |
| 6,418,421 B1 | 7/2002 | Hurtado |
| 6,425,081 B1 | 7/2002 | Iwamura |
| 6,430,301 B1 | 8/2002 | Petrovic |
| 6,430,302 B2 | 8/2002 | Rhoads |
| 6,442,283 B1 | 8/2002 | Tewfik et al. |
| 6,446,211 B1 | 9/2002 | Colvin |
| 6,453,252 B1 | 9/2002 | Laroche |
| 6,457,058 B1 | 9/2002 | Ullum et al. |
| 6,463,468 B1 | 10/2002 | Buch et al. |
| 6,484,264 B1 | 11/2002 | Colvin |
| 6,493,457 B1 | 12/2002 | Quackenbush |
| 6,502,195 B1 | 12/2002 | Colvin |
| 6,522,767 B1 | 2/2003 | Moskowitz et al. |
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,539,475 B1 | 3/2003 | Cox et al. |
| 6,557,103 B1 | 4/2003 | Boncelet, Jr. et al. |
| 6,584,125 B1 | 6/2003 | Katto |
| 6,587,837 B1 | 7/2003 | Spagna et al. |
| 6,590,996 B1 | 7/2003 | Reed |
| 6,598,162 B1 | 7/2003 | Moskowitz |
| 6,606,393 B1 | 8/2003 | Xie et al. |
| 6,611,599 B2 | 8/2003 | Natarajan |
| 6,647,424 B1 | 11/2003 | Pearson et al. |
| 6,658,010 B1 | 12/2003 | Enns et al. |
| 6,665,489 B2 | 12/2003 | Collart |
| 6,668,246 B1 | 12/2003 | Yeung et al. |
| 6,668,325 B1 | 12/2003 | Collberg et al. |
| 6,674,858 B1 | 1/2004 | Kimura |
| 6,687,683 B1 | 2/2004 | Harada et al. |
| 6,725,372 B1 | 4/2004 | Lewis et al. |
| 6,754,822 B1 | 6/2004 | Zhao |
| 6,775,772 B1 | 8/2004 | Binding et al. |
| 6,784,354 B1 | 8/2004 | Lu et al. |
| 6,785,815 B1 | 8/2004 | Serret-Avila et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,799,277 B2 | 9/2004 | Colvin |
| 6,804,453 B1 * | 10/2004 | Sasamoto et al. ............ 386/258 |
| 6,813,717 B2 | 11/2004 | Colvin |
| 6,813,718 B2 | 11/2004 | Colvin |
| 6,823,455 B1 | 11/2004 | Macy et al. |
| 6,834,308 B1 | 12/2004 | Ikezoye et al. |
| 6,842,862 B2 | 1/2005 | Chow et al. |
| 6,853,726 B1 | 2/2005 | Moskowitz et al. |
| 6,857,078 B2 | 2/2005 | Colvin |
| 6,865,747 B1 | 3/2005 | Mercier |
| 6,931,534 B1 | 8/2005 | Jandel et al. |
| 6,957,330 B1 | 10/2005 | Hughes |
| 6,966,002 B1 | 11/2005 | Torrubia-Saez |
| 6,977,894 B1 | 12/2005 | Achilles et al. |
| 6,978,370 B1 | 12/2005 | Kocher |
| 6,983,337 B2 | 1/2006 | Diamant |
| 6,986,063 B2 | 1/2006 | Colvin |
| 6,990,453 B2 | 1/2006 | Wang |
| 7,007,166 B1 | 2/2006 | Moskowitz et al. |
| 7,020,285 B1 | 3/2006 | Kirovski et al. |
| 7,035,049 B2 | 4/2006 | Yamamoto |
| 7,035,409 B1 | 4/2006 | Moskowitz |
| 7,043,050 B2 | 5/2006 | Yuval |
| 7,046,808 B1 | 5/2006 | Metois et al. |
| 7,050,396 B1 | 5/2006 | Cohen et al. |
| 7,051,208 B2 | 5/2006 | Venkatesan et al. |
| 7,058,570 B1 | 6/2006 | Yu et al. |
| 7,093,295 B1 | 8/2006 | Saito |
| 7,095,874 B2 | 8/2006 | Moskowitz et al. |
| 7,103,184 B2 | 9/2006 | Jian |
| 7,107,451 B2 | 9/2006 | Moskowitz |
| 7,123,718 B1 | 10/2006 | Moskowitz et al. |
| 7,127,615 B2 | 10/2006 | Moskowitz |
| 7,150,003 B2 | 12/2006 | Naumovich et al. |
| 7,152,162 B2 | 12/2006 | Moskowitz et al. |
| 7,159,116 B2 | 1/2007 | Moskowitz |
| 7,162,642 B2 | 1/2007 | Schumann et al. |
| 7,177,429 B2 | 2/2007 | Moskowitz et al. |
| 7,177,430 B2 | 2/2007 | Kim |
| 7,206,649 B2 | 4/2007 | Kirovski et al. |
| 7,231,524 B2 | 6/2007 | Burns |
| 7,233,669 B2 | 6/2007 | Candelore |
| 7,240,210 B2 | 7/2007 | Michak et al. |
| 7,266,697 B2 | 9/2007 | Kirovski et al. |
| 7,286,451 B2 | 10/2007 | Wirtz |
| 7,287,275 B2 | 10/2007 | Moskowitz |
| 7,289,643 B2 | 10/2007 | Brunk et al. |
| 7,343,492 B2 | 3/2008 | Moskowitz et al. |
| 7,346,472 B1 | 3/2008 | Moskowitz et al. |
| 7,362,775 B1 | 4/2008 | Moskowitz |
| 7,363,278 B2 | 4/2008 | Schmelzer et al. |
| 7,409,073 B2 | 8/2008 | Moskowitz et al. |
| 7,457,962 B2 | 11/2008 | Moskowitz |
| 7,460,994 B2 | 12/2008 | Herre et al. |
| 7,475,246 B1 | 1/2009 | Moskowitz |
| 7,530,102 B2 | 5/2009 | Moskowitz |
| 7,532,725 B2 | 5/2009 | Moskowitz et al. |
| 7,568,100 B1 | 7/2009 | Moskowitz et al. |
| 7,647,502 B2 | 1/2010 | Moskowitz |
| 7,647,503 B2 | 1/2010 | Moskowitz |
| 7,664,263 B2 | 2/2010 | Moskowitz |
| 7,743,001 B1 | 6/2010 | Vermeulen |
| 7,761,712 B2 | 7/2010 | Moskowitz |
| 7,779,261 B2 | 8/2010 | Moskowitz |
| 2001/0010078 A1 | 7/2001 | Moskowitz |
| 2001/0029580 A1 | 10/2001 | Moskowitz |
| 2001/0043594 A1 | 11/2001 | Ogawa et al. |
| 2002/0009208 A1 | 1/2002 | Alattar |
| 2002/0010684 A1 | 1/2002 | Moskowitz |
| 2002/0026343 A1 | 2/2002 | Duenke |
| 2002/0047873 A1 | 4/2002 | Imanaka et al. |
| 2002/0056041 A1 | 5/2002 | Moskowitz |
| 2002/0071556 A1 | 6/2002 | Moskowitz et al. |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0161741 A1 | 10/2002 | Wang et al. |
| 2003/0002862 A1 | 1/2003 | Rodriguez |
| 2003/0126445 A1 | 7/2003 | Wehrenberg |
| 2003/0133702 A1 | 7/2003 | Collart |
| 2003/0200439 A1 | 10/2003 | Moskowitz |
| 2003/0219143 A1 | 11/2003 | Moskowitz et al. |
| 2004/0028222 A1 | 2/2004 | Sewell et al. |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0086119 A1 | 5/2004 | Moskowitz |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0125983 A1 | 7/2004 | Reed et al. |
| 2004/0128514 A1 | 7/2004 | Rhoads |
| 2004/0225894 A1 | 11/2004 | Colvin |
| 2004/0243540 A1 | 12/2004 | Moskowitz et al. |
| 2005/0135615 A1 | 6/2005 | Moskowitz et al. |
| 2005/0160271 A9 | 7/2005 | Brundage et al. |
| 2005/0177727 A1 | 8/2005 | Moskowitz et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2006/0013451 A1 | 1/2006 | Haitsma |
| 2006/0041753 A1 | 2/2006 | Haitsma |
| 2006/0101269 A1 | 5/2006 | Moskowitz et al. |
| 2006/0140403 A1 | 6/2006 | Moskowitz |
| 2006/0251291 A1 | 11/2006 | Rhoads |
| 2006/0285722 A1 | 12/2006 | Moskowitz et al. |
| 2007/0011458 A1 | 1/2007 | Moskowitz |
| 2007/0028113 A1 | 2/2007 | Moskowitz |
| 2007/0064940 A1 | 3/2007 | Moskowitz et al. |
| 2007/0079131 A1 | 4/2007 | Moskowitz et al. |
| 2007/0083467 A1 | 4/2007 | Lindahl et al. |
| 2007/0110240 A1 | 5/2007 | Moskowitz et al. |
| 2007/0113094 A1 | 5/2007 | Moskowitz et al. |

| | | | |
|---|---|---|---|
| 2007/0127717 A1 | 6/2007 | Herre et al. | |
| 2007/0226506 A1 | 9/2007 | Moskowitz | |
| 2007/0253594 A1 | 11/2007 | Lu et al. | |
| 2007/0294536 A1 | 12/2007 | Moskowitz et al. | |
| 2007/0300072 A1 | 12/2007 | Moskowitz | |
| 2007/0300073 A1 | 12/2007 | Moskowitz | |
| 2008/0005571 A1 | 1/2008 | Moskowitz | |
| 2008/0005572 A1 | 1/2008 | Moskowitz | |
| 2008/0016365 A1 | 1/2008 | Moskowitz | |
| 2008/0022113 A1 | 1/2008 | Moskowitz | |
| 2008/0022114 A1 | 1/2008 | Moskowitz | |
| 2008/0028222 A1 | 1/2008 | Moskowitz | |
| 2008/0046742 A1 | 2/2008 | Moskowitz | |
| 2008/0075277 A1 | 3/2008 | Moskowitz et al. | |
| 2008/0109417 A1 | 5/2008 | Moskowitz | |
| 2008/0133927 A1 | 6/2008 | Moskowitz et al. | |
| 2008/0151934 A1 | 6/2008 | Moskowitz et al. | |
| 2009/0037740 A1 | 2/2009 | Moskowitz | |
| 2009/0089427 A1 | 4/2009 | Moskowitz et al. | |
| 2009/0190754 A1 | 7/2009 | Moskowitz et al. | |
| 2009/0210711 A1 | 8/2009 | Moskowitz | |
| 2009/0220074 A1 | 9/2009 | Moskowitz et al. | |
| 2010/0002904 A1 | 1/2010 | Moskowitz | |
| 2010/0005308 A1 | 1/2010 | Moskowitz | |
| 2010/0064140 A1 | 3/2010 | Moskowitz | |
| 2010/0077219 A1 | 3/2010 | Moskowitz | |
| 2010/0077220 A1 | 3/2010 | Moskowitz | |
| 2010/0098251 A1 | 4/2010 | Moskowitz | |
| 2010/0106736 A1 | 4/2010 | Moskowitz | |
| 2010/0153734 A1 | 6/2010 | Moskowitz | |
| 2010/0182570 A1 | 7/2010 | Chota | |
| 2010/0202607 A1 | 8/2010 | Moskowitz | |
| 2010/0220861 A1 | 9/2010 | Moskowitz | |

FOREIGN PATENT DOCUMENTS

| | | | |
|---|---|---|---|
| EP | 0565947 | | 10/1993 |
| EP | 0581317 | | 2/1994 |
| EP | 0581317 | A2 | 2/1994 |
| EP | 0649261 | | 4/1995 |
| EP | 0651554 | | 5/1995 |
| EP | 0872073 | | 7/1996 |
| EP | 1547337 | | 3/2006 |
| EP | 1354276 | | 12/2007 |
| NL | 1005523 | | 9/1998 |
| WO | WO 9514289 | | 5/1995 |
| WO | WO 9629795 | | 9/1996 |
| WO | WO 9642151 | | 12/1996 |
| WO | WO9701892 | | 1/1997 |
| WO | WO9726733 | | 1/1997 |
| WO | WO 9724833 | | 7/1997 |
| WO | WO9726732 | | 7/1997 |
| WO | WO 9744736 | | 11/1997 |
| WO | WO9802864 | | 1/1998 |
| WO | WO9837513 | | 8/1998 |
| WO | WO 9952271 | | 10/1999 |
| WO | WO 9962044 | | 12/1999 |
| WO | WO 9963443 | | 12/1999 |
| WO | WO 0057643 | | 9/2000 |
| WO | WO0118628 | | 3/2001 |
| WO | WO0143026 | | 6/2001 |
| WO | WO0203385 | | 1/2002 |
| WO | WO02003385 | A1 | 10/2002 |

OTHER PUBLICATIONS

Brealy, et al., Principles of Corporate Finance, "Appendix A—Using Option Valuation Models", 1984, pp. 448-449.
Copeland, et al., Real Options: A Practitioner's Guide, 2001 pp. 106-107, 201-202, 204-208.
Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html on.
Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.
Low, S.H., "Equilibrium Allocation and Pricing of Variable Resources Among User-Suppliers", 1988. http://www.citesear.nj.nec.com/366503.html.
Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.
Zhao, Jian. "A WWW Service to Embed and Prove Digital Copyright Watermarks", Proc. of the European conf. on Multimedia Applications, Services & Techniques Louvain-La-Nevve Belgium May 1996.
Gruhl, Daniel et al., Echo Hiding. In Proceeding of the Workshop on Information Hiding. No. 1174 in Lecture Notes in Computer Science, Cambridge, England (May/Jun. 1996).
Oomen, A.W.J. et al., A Variable Bit Rate Buried Data Channel for Compact Disc, J.AudioEng. Sc., vol. 43, No. 1/2, pp. 23-28 (1995).
Ten Kate, W. et al., A New Surround-Stereo-Surround Coding Techniques, J. Audio Eng.Soc., vol. 40,No. 5,pp. 376-383 (1992).
Gerzon, Michael et al., A High Rate Buried Data Channel for Audio CD, presentation notes, Audio Engineering Soc. 94th Convention (1993).
Sklar, Bernard, Digital Communications, pp. 601-603 (1988).
Jayant, N.S. et al., Digital Coding of Waveforms, Prentice Hall Inc., Englewood Cliffs, NJ, pp. 486-509 (1984).
Bender, Walter R. et al., Techniques for Data Hiding, SPIE Int. Soc. Opt. Eng., vol. 2420, pp. 164-173, 1995.
Zhao, Jian et al., Embedding Robust Labels into Images for Copyright Protection, (xp 000571976), pp. 242-251, 1995.
Menezes, Alfred J., Handbook of Applied Cryptography, CRC Press, p. 175, 1997.
Schneier, Bruce, Applied Cryptography, 1st Ed., pp. 67-68, 1994.
Ten Kate, W. et al., "Digital Audio Carrying Extra Information", IEEE, CH 2847-2/90/0000-1097, (1990).
Van Schyndel, et al., "A digital Watermark," IEEE Int'l Computer Processing Conference, Austin,TX, Nov. 13-16, 1994, pp. 86-90.
Smith, et al. "Modulation and Information Hiding in Images", Springer Verlag, 1st Int'l Workshop, Cambridge, UK, May 30-Jun. 1, 1996, pp. 207-227.
1997, Kutter, Martin et al., "Digital Signature of Color Images Using Amplitude Modulation", SPIE-E197, vol. 3022, pp. 518-527.
Puate, Joan et al., "Using Fractal Compression Scheme to Embed a Digital Signature into an Image", SPIE-96 Proceedings, vol. 2915, Mar. 1997, pp. 108-118.
Swanson, Mitchell D.,et al., "Transparent Robust Image Watermarking", Proc. of the 1996 IEEE Int'l Conf. on Image Processing, vol. 111, 1996 , pp. 211-214.
Swanson, Mitchell D., et al. "Robust Data Hiding for Images", 7th IEEE Digital Signal Processing Workshop, Leon, Norway. Sep. 1-4, 1996, pp. 37-40.
Zhao, Jian et al., "Embedding Robust Labels into Images for Copyright Protection", Proceeding of the Know Right '95 Conference, pp. 242-251.
Koch, E., et al., "Towards Robust and Hidden Image Copyright Labeling", 1995 IEEE Workshop on Nonlinear Signal and Image Processing, Jun. 1995 Neos Marmaras pp. 4.
Van Schyandel, et al., "Towards a Robust Digital Watermark", Second Asain Image Processing Conference, Dec. 6-8, 1995, Singapore, vol. 2, pp. 504-508.
Tirkel,A.Z., "A Two-Dimensional Digital Watermark", DICTA '95, Univ. of Queensland, Brisbane, Dec. 5-8, 1995, pp. 7.
Tirkel,A.Z., "Image Watermarking—A Spread Spectrum Application", ISSSTA '96, Sep. 1996, Mainz, German, pp. 6.
O'Ruanaidh, et al. "Watermarking Digital Images for Copyright Protection", IEEE Proceedings, vol. 143, No. 4, Aug. 1996, pp. 250-256.
Cox, et al., Secure Spread Spectrum Watermarking for Multimedia, NEC Research Institute, Techinal Report 95-10, pp. 33.
Kahn, D., "The Code Breakers", The MacMillan Company, 1969, pp. xIII, 81-83, 513, 515, 522-526, 863.
Boney, et al., Digital Watermarks for Audio Signals, EVSIPCO, 96, pp. 473-480 (Mar. 14, 1997).
Dept. of Electrical Engineering, Del Ft University of Technology, Del ft The Netherlands, Cr.C. Langelaar et al.,"Copy Protection for Multimedia Data based on Labeling Techniques", Jul. 1996 9 pp.
F. Hartung, et al., "Digital Watermarking of Raw and Compressed Video", SPIE vol. 2952, pp. 205-213.

Craver, et al., "Can Invisible Watermarks Resolve Rightful Ownerships?", IBM Research Report, RC 20509 (Jul. 25, 1996) 21 pp.
Press, et al., "Numerical Recipes in C", Cambridge Univ. Press, 1988, pp. 398-417.
Pohlmann, Ken C., "Principles of Digital Audio", 3rd Ed., 1995, pp. 32-37, 40-48:138; 147-149, 332, 333, 364, 499-501, 508-509, 564-571.
Pohlmann, Ken C., "Principles of Digital Audio", 2nd Ed., 1991, pp. 1-9, 19-25, 30-33, 41-48, 54-57, 86-107, 375-387.
Schneier, Bruce, Applied Cryptography, John Wiley & Sons, Inc., New York, 1994, pp. 68, 69, 387-392, 1-57, 273-275, 321-324.
Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.
Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).
Rivest, et al., "Pay Word and Micromint: Two Simple Micropayment Schemes," MIT Laboratory for Computer Science, Cambridge, MA, May 7, 1996 pp. 1-18.
Bender, et al., "Techniques for Data Hiding", IBM Systems Journal, (1996) vol. 35, Nos. 3 & 4,1996, pp. 313-336.
Moskowitz, "Bandwith as Currency", IEEE Multimedia, Jan.-Mar. 2003, pp. 14-21.
Moskowitz, Multimedia Security Technologies for Digital Rights Management, 2006, Academic Press, "Introduction—Digital Rights Management" pp. 3-22.
Rivest, et al., "PayWord and Micromint: Two Simple Micropayment Schemes," MIT Laboratory for Computer Science, Cambridge, MA, Apr. 27, 2001, pp. 1-18.
Tomsich, et al., "Towards a secure and de-centralized digital watermarking infrastructure for the protection of Intellectual Property", in Electronic Commerce and Web Technologies, Proceedings (ECWEB)(2000).
Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.
Lemma, et al. "Secure Watermark Embedding through Partial Encryption", International Workshop on Digital Watermarking ("IWDW" 2006). Springer Lecture Notes in Computer Science 2006 (to appear) 13.
Kocher, et al., "Self Protecting Digital Content", Technical Report from the CRI Content Security Research Initiative, Cryptography Research, Inc. 2002-2003 14 pages.
Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.
Schunter, M. et al., "A Status Report on the SEMPER framework for Secure Electronic Commerce", Computer Networks and ISDN Systems, Sep. 30, 1998, pp. 1501-1510 vol. 30 No. 16-18 NL North Holland.
Konrad, K. et al., "Trust and Electronic Commerce—more than a technical problem," Proceedings of the 18th IEEE Symposium on Reliable Distributed Systems Oct. 19-22, 1999, pp. 360-365 Lausanne.
Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.
Steinauer D. D., et al., "Trust and Traceability in Electronic Commerce", Standard View, Sep. 1997, pp. 118-124, vol. 5 No. 3, ACM, USA.
Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.
European Search Report & European Search Opinion in EP07112420.
STAIND (The Singles 1996-2006), Warner Music—Atlantic, Pre-Release CD image, 2006, 1 page.
Radiohead ("Hail to the Thief"), EMI Music Group—Capitol, Pre-Release CD image, 2003, 1 page.

U.S. Appl. No. 60/169,274, filed Dec. 7, 1999, entitled "Systems, Methods and Devices for Trusted Transactions".
U.S. Appl. No. 60/234,199, filed Sep. 20, 2000, "Improved Security Based on Subliminal and Supraliminal Channels for Data Objects".
U.S. Appl. No. 09/671,739, filed Sep. 29, 2000, entitled "Method and Device for Monitoring and Analyzing Signals".
Tirkel, A.Z., "A Two Dimensional Digital Watermark", Scientific Technology, 686, 14, date unknown.
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.
Delaigle, J.-F., et al. "Digital Watermarking," Proceedings of the SPIE, vol. 2659, Feb. 1, 1996, pp. 99-110.
Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.
Joseph J.K. O'Ruanaidh and Thierry Pun, "Rotation, Scale and Translation Invariant Digital Image Watermarking", Submitted to Signal Processing Aug. 21, 1997, 19 pages.
Oasis (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffing.txt Apr. 24, 1998, 9 pp.
PortalPlayer, PP502 digital media management system-on-chip, May 1, 2003, 4 pp.
VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoff's-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26, 2007, http://web.archive,org/web/20070826151732/http://www.screenplaysmag.com/t-abid/96/articleType/ArticleView/articleId/495/Default.aspx/.
"YouTube Copyright Policy: Video Identification tool—YouTube Help", accessed Jun. 4, 2009, http://www.google.com/support/youtube/bin/answer.py?hl=en&answer=83766, 3 pp.
PCT Application No. PCT/US95/08159, filed Jun. 26, 1995, entitled, "Digital Information Commodities Exchange with Virtual Menuing", published as WO/1997/001892; Publication Date: Jan. 16, 1997.

PCT Application No. PCT/US96/10257, filed Jun. 7, 1996, entitled "Steganographic Method and Device"—corresponding to—EPO Application No. 96919405.9, entitled "Steganographic Method and Device", published as WO/1996/042151; Publication Date: Dec. 27, 1996.
PCT Application No. PCT/US97/00651, filed Jan. 16, 1997, entitled, "Method for Stega-Cipher Protection of Computer Code", published as WO/1997/026732; Publication Date: Jul. 24, 1997.
PCT Application No. PCT/US97/00652, filed Jan. 17, 1997, entitled, "Method for an Encrypted Digital Watermark", published as WO/1997/026733; Publication Date: Jul. 24, 1997.
PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.
PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.
PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.
PCT Application No. PCT/US00/18411, filed Jul. 5, 2000, entitled, "Copy Protection of Digital Data Combining Steganographic and Cryptographic Techniques".
PCT Application No. PCT/US00/33126, filed Dec. 7, 2000, entitled "Systems, Methods and Devices for Trusted Transactions", published as WO/2001/043026; Publication Date: Jun. 14, 2001.
EPO Divisional Patent Application No. 07112420.0, entitled "Steganographic Method and Device" corresponding to PCT Application No. PCT/US96/10257, published as WO/1996/042151, Dec. 27, 1996.
U.S. Appl. No. 60/222,023, filed Jul. 31, 2007 entitled "Method and apparatus for recognizing sound and signals in high noise and distortion".
"Techniques for Data Hiding in Audio Files," by Morimoto, 1995.
Howe, Dennis Jul. 13, 1998 http://foldoc..org//steganography.
CSG, Computer Support Group and CSGNetwork.com 1973 http://www.csgnetwork.com/glossarys.html.
QuinStreet Inc. 2010 What is steganography?—A word definition from the Webopedia Computer Dictionary http://www.webopedia.com/terms/steganography.html.
Graham, Robert Aug. 21, 2000 "Hacking Lexicon" http://robertgraham.com/pubs/hacking-dict.html.
Farkex, Inc 2010 "Steganography definition of steganography in the Free Online Encyclopedia" http://encyclopedia2.Thefreedictionary.com/steganography.
Horowitz, et al., The Art of Eletronics. $2^{nd}$ Ed., 1989, pp7.
Jimmy eat world ("futures"), Interscope Records, Pre-Release CD image, 2004, 1 page.
Aerosmith ("Just Push Play"), Pre-Release CD image, 2001, 1 page.
Phil Collins(Testify) Atlantic, Pre-Release CD image, 2002, 1 page.
U.S. Appl. No. 11/599,838, filed Nov. 15, 2006.
U.S. Appl. No. 11/899,662, filed Sep. 7, 2007.
U.S. Appl. No. 10/369,344, filed Feb. 18, 2003.
U.S. Appl. No. 11/482,654, filed Jul. 7, 2006.
U.S. Appl. No. 12/215,812, filed Jun. 30, 2008.
U.S. Appl. No. 12/901,568, filed Oct. 10, 2010.
U.S. Appl. No. 11/497,822, filed Aug. 2, 2006.
U.S. Appl. No. 12/217,834, filed Jul. 9, 2008.
U.S. Appl. No. 12/462,799, filed Aug. 10, 2009.
U.S. Appl. No. 11/899,661, filed Sep. 7, 2007.
U.S. Appl. No. 12/590,681, filed Nov. 19, 2009.
U.S. Appl. No. 11/897,791, filed Aug. 31, 2007.
U.S. Appl. No. 12/590,553, filed Nov. 10, 2009.
U.S. Appl. No. 12/592,331, filed Nov. 23, 2009.
U.S. Appl. No. 12/009,914, filed Jan. 23, 2008.
U.S. Appl. No. 12/005,230, filed Dec. 26, 2007.
U.S. Appl. No. 12/803,168, filed Jun. 21, 2010.
U.S. Appl. No. 11/649,026, filed Jan. 3, 2007.
U.S. Appl. No. 12/803,194, filed Jun. 21, 2010.
U.S. Appl. No. 12/892,900, filed Sep. 28, 2010.
U.S. Appl. No. 08/999,766, filed Jul. 23, 1997.
U.S. Appl. No. 11/894,476, filed Aug. 21, 2007.
U.S. Appl. No. 11/050,779, filed Feb. 7, 2005.
U.S. Appl. No. 12/802,519, filed Jun. 8, 2010.
U.S. Appl. No. 12/383,916, filed Mar. 30, 2009.
U.S. Appl. No. 11/894,443, filed Aug. 21, 2007.
U.S. Appl. No. 12/913,751, filed Oct. 27, 2010.
U.S. Appl. No. 11/512,701, filed Aug. 29, 2006.
U.S. Appl. No. 11/895,388, filed Aug. 24, 2007.
U.S. Appl. No. 12/383,879, filed Mar. 30, 2009.
U.S. Appl. No. 12/886,732, filed Sep. 21, 2010.
U.S. Appl. No. 12/287,443, filed Oct. 9, 2008.
U.S. Appl. No. 12/655,357, filed Dec. 22, 2009.
U.S. Appl. No. 13/035,964, filed Feb. 26, 2011.
U.S. Appl. No. 11/900,065, filed Sep. 10, 2007.
U.S. Appl. No. 12/799,894, filed May 4, 2010.

* cited by examiner

METHOD AND DEVICE FOR MONITORING AND ANALYZING SIGNALS

CROSS-REFERENCE TO RELATED APPLICATIONS

This application is a continuation of application Ser. No. 12/655,357, filed Dec. 22, 2009 now U.S. Pat. No. 7,949,494, which is a continuation of application Ser. No. 12/005,229, filed Dec. 26, 2007, now U.S. Pat. No. 7,660,700, which is a continuation of application Ser. No. 09/657,181, filed Sep. 7, 2000, now U.S. Pat. No. 7,346,472. The previously identified patents and/or patent applications are hereby incorporated by reference, in their entireties, as if fully stated herein.

This application is related to U.S. patent application Ser. No. 08/999,766, filed Jul. 23, 1997, entitled "Steganographic Method and Device" (issued as U.S. Pat. No. 7,568,100); U.S. patent application Ser. No. 08/772,222, filed Dec. 20, 1996, entitled "Z-Transform Implementation of Digital Watermarks" (issued as U.S. Pat. No. 6,078,664); U.S. patent application Ser. No. 09/456,319, filed Dec. 8, 1999, entitled "Z-Transform Implementation of Digital Watermarks" (issued as U.S. Pat. No. 6,853,726); U.S. patent application Ser. No. 08/674,726, filed Jul. 2, 1996, entitled "Exchange Mechanisms for Digital Information Packages with Bandwidth Securitization, Multichannel Digital Watermarks, and Key Management" (issued as U.S. Pat. No. 7,362,775); U.S. patent application Ser. No. 09/545,589, filed Apr. 7, 2000, entitled "Method and System for Digital Watermarking" (issued as U.S. Pat. No. 7,007,166); U.S. patent application Ser. No. 09/046,627, filed Mar. 24, 1998, entitled "Method for Combining Transfer Function with Predetermined Key Creation" (issued as U.S. Pat. No. 6,598,162); U.S. patent application Ser. No. 09/053,628, filed Apr. 2, 1998, entitled "Multiple Transform Utilization and Application for Secure Digital Watermarking" (issued as U.S. Pat. No. 6,205,249); U.S. patent application Ser. No. 09/281,279, filed Mar. 30, 1999, entitled "Optimization Methods for the Insertion, Protection, and Detection of Digital Watermarks in Digital Data (issued as U.S. Pat. No. 6,522,767)"; U.S. patent application Ser. No. 09/594,719, filed Jun. 16, 2000, entitled "Utilizing Data Reduction in Steganographic and Cryptographic Systems" (which is a continuation-in-part of PCT application No. PCT/US00/06522, filed Mar. 14, 2000, which PCT application claimed priority to U.S. Provisional Application No. 60/125,990, filed Mar. 24, 1999) (issued as U.S. Pat. No. 7,123,718); U.S. Application No. 60/169,274, filed Dec. 7, 1999, entitled "Systems, Methods And Devices For Trusted Transactions" (issued as U.S. Pat. No. 7,159,116); and PCT Application No. PCT/US00/21189, filed Aug. 4, 2000 (which claims priority to U.S. patent application Ser. No. 60/147,134, filed Aug. 4, 1999, and to U.S. patent application Ser. No. 60/213,489, filed Jun. 23, 2000, both of which are entitled, "A Secure Personal Content Server") (issued as U.S. Pat. No. 7,475,246). The previously identified patents and/or patent applications are hereby incorporated by reference, in their entireties, as if fully stated herein.

In addition, this application hereby incorporates by reference, as if fully stated herein, the total disclosures of U.S. Pat. No. 5,613,004 "Steganographic Method and Device"; U.S. Pat. No. 5,745,569 "Method for Stega-Cipher Protection of Computer Code"; and U.S. Pat. No. 5,889,868 "Optimization Methods for the Insertion, Protection, and Detection of Digital Watermarks in Digitized Data."

BACKGROUND OF THE INVENTION

1. Field of the Invention

The invention relates to the monitoring and analysis of digital information. A method and device are described which relate to signal recognition to enhance identification and monitoring activities.

2. Description of the Related Art

Many methods and protocols are known for transmitting data in digital form for multimedia applications (including computer applications delivered over public networks such as the internet or World Wide Web ("WWW"). These methods may include protocols for the compression of data, such that it may more readily and quickly be delivered over limited bandwidth data lines. Among standard protocols for data compression of digital files may be mentioned the MPEG compression standards for audio and video digital compression, promulgated by the Moving Picture Experts Group. Numerous standard reference works and patents discuss such compression and transmission standards for digitized information.

Digital watermarks help to authenticate the content of digitized multimedia information, and can also discourage piracy. Because piracy is clearly a disincentive to the digital distribution of copyrighted content, establishment of responsibility for copies and derivative copies of such works is invaluable. In considering the various forms of multimedia content, whether "master," stereo, NTSC video, audio tape or compact disc, tolerance of quality will vary with individuals and affect the underlying commercial and aesthetic value of the content. It is desirable to tie copyrights, ownership rights, purchaser information or some combination of these and related data into the content in such a manner that the content must undergo damage, and therefore reduction of its value, with subsequent, unauthorized distribution, commercial or otherwise. Digital watermarks address many of these concerns. A general discussion of digital watermarking as it has been applied in the art may be found in U.S. Pat. No. 5,687,236 (whose specification is incorporated in whole herein by reference).

Further applications of basic digital watermarking functionality have also been developed. Examples of such applications are shown in U.S. Pat. No. 5,889,868 (whose specification is incorporated in whole herein by reference). Such applications have been drawn, for instance, to implementations of digital watermarks that were deemed most suited to particular transmissions, or particular distribution and storage mediums, given the nature of digitally sampled audio, video, and other multimedia works. There have also been developed techniques for adapting watermark application parameters to the individual characteristics of a given digital sample stream, and for implementation of digital watermarks that are feature-based—i.e., a system in which watermark information is not carried in individual samples, but is carried in the relationships between multiple samples, such as in a waveform shape. For instance, natural extensions may be added to digital watermarks that may also separate frequencies (color or audio), channels in 3D while utilizing discreteness in feature-based encoding only known to those with pseudo-random keys (i.e., cryptographic keys) or possibly tools to access such information, which may one day exist on a quantum level.

A matter of general weakness in digital watermark technology relates directly to the manner of implementation of the watermark. Many approaches to digital watermarking leave detection and decode control with the implementing party of the digital watermark, not the creator of the work to be protected. This weakness removes proper economic incentives for improvement of the technology. One specific form of exploitation mostly regards efforts to obscure subsequent watermark detection. Others regard successful over encoding using the same watermarking process at a subsequent time. Yet another way to perform secure digital watermark implementation is through "key-based" approaches.

SUMMARY OF THE INVENTION

A method for monitoring and analyzing at least one signal is disclosed, which method comprises the steps of: receiving at least one reference signal to be monitored; creating an abstract of the at least one reference signal; storing the abstract of the at least one reference signal in a reference database; receiving at least one query signal to be analyzed; creating an abstract of the at least one query signal; and comparing the abstract of the at least one query signal to the abstract of the at least one reference signal to determine if the abstract of the at least one query signal matches the abstract of the at least one reference signal.

A method for monitoring a plurality of reference signals is also disclosed, which method comprises the steps of: creating an abstract for each one of a plurality of reference signals; storing each of the abstracts in a reference database; receiving at least one query signal to be analyzed; creating an abstract of each at least one query signal; locating an abstract in the reference database that matches the abstract of each at least one query signal; and recording the identify of the reference signal whose abstract matched the abstract of each at least one query signal.

A computerized system for monitoring and analyzing at least one signal is also disclosed, which system comprises: a processor for creating an abstract of a signal using selectable criteria; a first input for receiving at least one reference signal to be monitored, the first input being coupled to the processor such that the processor may generate an abstract for each reference signal input to the processor; a reference database, coupled to the processor, for storing abstracts of each at least one reference signal; a second input for receiving at least one query signal to be analyzed, the second input being coupled to the processor such that the processor may generate an abstract for each query signal; and a comparing device, coupled to the reference database and to the second input, for comparing an abstract of the at least one query signal to the abstracts stored in the reference database to determine if the abstract of the at least one query signal matches any of the stored abstracts.

Further, an electronic system for monitoring and analyzing at least one signal is disclosed, which system comprises: a first input for receiving at least one reference signal to be monitored, a first processor for creating an abstract of each reference signal input to the first processor through the first input; a second input for receiving at least one query signal to be analyzed, a second processor for creating an abstract of each query signal; a reference database for storing abstracts of each at least one reference signal; and a comparing device for comparing an abstract of the at least one query signal to the abstracts stored in the reference database to determine if the abstract of the at least one query signal matches any of the stored abstracts.

DETAILED DESCRIPTION OF THE INVENTION

While there are many approaches to data reduction that can be utilized, a primary concern is the ability to reduce the digital signal in such a manner as to retain a "perceptual relationship" between the original signal and its data reduced version. This relationship may either be mathematically discernible or a result of market-dictated needs. The purpose is to afford a more consistent means for classifying signals than proprietary, related text-based approaches. A simple analogy is the way in which a forensic investigator uses a sketch artist to assist in determining the identity of a human.

In one embodiment of the invention, the abstract of a signal may be generated by the following steps: 1) analyze the characteristics of each signal in a group of audible/perceptible variations for the same signal (e.g., analyze each of five versions of the same song—which versions may have the same lyrics and music but which are sung by different artists); and 2) select those characteristics which achieve or remain relatively constant (or in other words, which have minimum variation) for each of the signals in the group. Optionally, the null case may be defined using those characteristics which are common to each member of the group of versions.

Lossless and lossy compression schemes are appropriate candidates for data reduction technologies, as are those subset of approaches that are based on perceptual models, such as AAC, MP3, TwinVQ, JPEG, GIF, MPEG, etc. Where spectral transforms fail to assist in greater data reduction of the signal, other signal characteristics can be identified as candidates for further data reduction. Linear predictive coding (LPC), z-transform analysis, root mean square (rms), signal to peak, may be appropriate tools to measure signal characteristics, but other approaches or combinations of signal characteristic analysis are contemplated. While such signal characteristics may assist in determining particular applications of the present invention, a generalized approach to signal recognition is necessary to optimize the deployment and use of the present invention.

Increasingly, valuable information is being created and stored in digital form. For example, music, photographs and motion pictures can all be stored and transmitted as a series of binary digits—1's and 0's. Digital techniques permit the original information to be duplicated repeatedly with perfect or near perfect accuracy, and each copy is perceived by viewers or listeners as indistinguishable from the original signal. Unfortunately, digital techniques also permit the information to be easily copied without the owner's permission. While digital representations of analog waveforms may be analyzed by perceptually-based or perceptually-limited analysis it is usually costly and time-consuming to model the processes of the highly effective ability of humans to identify and recognize a signal. In those applications where analog signals require analysis, the cost of digitizing the analog signal is minimal when compared to the benefits of increased accuracy and speed of signal analysis and monitoring when the processes contemplated by this invention are utilized.

The present invention relates to identification of digitally-sampled information, such as images, audio and video. Traditional methods of identification and monitoring of those signals do not rely on "perceptual quality," but rather upon a separate and additional signal. Within this application, such signals will be called "additive signals" as they provide information about the original images, audio or video, but such information is in addition to the original signal. One traditional, text-based additive signal is title and author information. The title and author, for example, is information about a book, but it is in addition to the text of the book. If a book is being duplicated digitally, the title and author could provide one means of monitoring the number of times the text is being duplicated, for example, through an Internet download. The present invention, however, is directed to the identification of a digital signal—whether text, audio, or video—using only the digital signal itself and then monitoring the number of times the signal is duplicated. Reliance on an additive signal has many shortcomings. For example, first, someone must incorporate the additive signal within the digital data being transmitted, for example, by concatenation or through an embedding process. Such an additive signal, however, can be easily identified and removed by one who wants to utilize the original signal without paying for its usage. If the original signal itself is used to identify the content, an unauthorized user could not avoid payment of a royalty simply by removing the additive signal—because there is no additive signal to remove. Hence, the present invention avoids a major disadvantage of the prior art.

One such additive signal that may be utilized is a digital watermark—which ideally cannot be removed without perceptually altering the original signal. A watermark may also be used as a monitoring signal (for example, by encoding an identifier that uniquely identifies the original digital signal into which the identifier is being embedded). A digital watermark used for monitoring is also an additive signal, and such a signal may make it difficult for the user who wants to duplicate a signal without paying a royalty—mainly by degrading the perceptual quality of the original signal if the watermark (and hence the additive monitoring signal) is removed. This is, however, is a different solution to the problem.

The present invention eliminates the need of any additive monitoring signal because the present invention utilizes the underlying content signal as the identifier itself. Nevertheless, the watermark may increase the value of monitoring techniques by increasing the integrity of the embedded data and by indicating tampering of either the original content signal or the monitoring signal. Moreover, the design of a watermarking embedding algorithm is closely related to the perceptibility of noise in any given signal and can represent an ideal subset of the original signal: the watermark bits are an inverse of the signal to the extent that lossy compression schemes, which can be used, for instance, to optimize a watermarking embedding scheme, can yield information about the extent to which a data signal can be compressed while holding steadfast to the design requirement that the compressed signal maintain its perceptual relationship with the original, uncompressed signal. By describing those bits that are candidates for imperceptible embedding of watermark bits, further data reduction may be applied on the candidate watermarks as an example of retaining a logical and perceptible relationship with the original uncompressed signal.

Of course, the present invention may be used in conjunction with watermarking technology (including the use of keys to accomplish secure digital watermarking), but watermarking is not necessary to practice the present invention. Keys for watermarking may have many forms, including: descriptions of the original carrier file formatting, mapping of embedded data (actually imperceptible changes made to the carrier signal and referenced to the predetermined key or key pairs), assisting in establishing the watermark message data integrity (by incorporation of special one way functions in the watermark message data or key), etc. Discussions of these systems in the patents and pending patent applications are incorporated by reference above. The "recognition" of a particular signal or an instance of its transmission, and its monitoring are operations that may be optimized through the use of digital watermark analysis.

A practical difference between the two approaches of using a separate, additive monitoring signal and using the original signal itself as the monitoring signal is control. If a separate signal is used for monitoring, then the originator of the text, audio or video signal being transmitted and the entity doing the monitoring have to agree as to the nature of the separate signal to be used for monitoring—otherwise, the entity doing the monitoring would not know where to look, for what to look, or how to interpret the monitoring signal once it was identified and detected. On the other hand, if the original signal is used itself as a monitoring signal, then no such agreement is necessary. Moreover, a more logical and self-sufficient relationship between the original and its data-reduced abstract enhances the transparency of any resulting monitoring efforts. The entity doing the monitoring is not looking for a separate, additive monitoring system, and further, need not have to interpret the content of the monitoring signal.

Monitoring implementations can be handled by robust watermark techniques (those techniques that are able to survive many signal manipulations but are not inherently "secure" for verification of a carrier signal absent a logically-related watermarking key) and forensic watermark techniques (which enable embedding of watermarks that are not able to survive perceptible alteration of the carrier signal and thus enable detection of tampering with the originally watermarked carrier signal). The techniques have obvious trade-offs between speed, performance and security of the embedded watermark data.

In other disclosures, we suggest improvements and implementations that relate to digital watermarks in particular and embedded signaling in general. A digital watermark may be used to "tag" content in a manner that is not humanly-perceptible, in order to ensure that the human perception of the signal quality is maintained. Watermarking, however, must inherently alter at least one data bit of the original signal to represent a minimal change from the original signal's "unwatermarked state." The changes may affect only a bit, at the very least, or be dependent on information hiding relating to signal characteristics, such as phase information, differences between digitized samples, root mean square (RMS) calculations, z-transform analysis, or similar signal characteristic category.

There are weaknesses in using digital watermark technology for monitoring purposes. One weakness relates directly to the way in which watermarks are implemented. Often, the persons responsible for encoding and decoding the digital watermark are not the creator of the valuable work to be protected. As such, the creator has no input on the placement of the monitoring signal within the valuable work being protected. Hence, if a user wishing to avoid payment of the royalty can find a way to decode or remove the watermark, or at least the monitoring signal embedded in the watermark, then the unauthorized user may successfully duplicate the signal with impunity. This could occur, for example, if either of the persons responsible for encoding or decoding were to have their security compromised such that the encoding or decoding algorithms were discovered by the unauthorized user.

With the present invention, no such disadvantages exist because the creator need not rely on anyone to insert a monitoring signal—as no such signal is necessary. Instead, the creator's work itself is used as the monitoring signal. Accordingly, the value in the signal will have a strong relationship with its recognizability.

By way of improving methods for efficient monitoring as well as effective confirmation of the identity of a digitally-sampled signal, the present invention describes useful methods for using digital signal processing for benchmarking a novel basis for differencing signals with binary data comparisons. These techniques may be complemented with perceptual techniques, but are intended to leverage the generally decreasing cost of bandwidth and signal processing power in an age of increasing availability and exchange of digitized binary data.

So long as there exist computationally inexpensive ways of identifying an entire signal with some fractional representation or relationship with the original signal, or its perceptually observable representation, we envision methods for faster and more accurate auditing of signals as they are played, distributed or otherwise shared amongst providers (transmitters) and consumers (receivers). The ability to massively compress a signal to its essence—which is not strictly equivalent to "lossy" or "lossless" compression schemes or perceptual coding techniques, but designed to preserve some underlying "aesthetic quality" of the signal—represents a useful means for signal analysis in a wide variety of applications. The signal analysis, however, must maintain the ability to distinguish the perceptual quality of the signals being compared. For example, a method which analyzed a portion of a song by compressing it to a single line of lyrics fails to maintain the ability to distinguish the perceptual quality of the songs being compared. Specifically, for example, if the song "New York State of Mind" were compressed to the lyrics "I'm in a New York State of Mind," such a compression fails to maintain the ability to distinguish between the various recorded versions of the song, say, for example between Billy Joel's recording and Barbara Streisand's recording. Such a method is, therefore, incapable of providing accurate monitoring of the artist's recordings because it could not determine which of the two artists is deserving of a royalty—unless of course, there is a separate monitoring signal to provide the name of the artist or other information sufficient to distinguish the two versions. The present invention, however, aims to maintain some level of perceptual quality of the signals being compared and would deem such a compression to be excessive.

This analogy can be made clearer if it is understood that there are a large number of approaches to compressing a signal to, say, $\frac{1}{10,000}^{th}$ of its original size, not for maintaining its signal quality to ensure computational ease for commercial quality distribution, but to assist in identification, analysis or monitoring of the signal. Most compression is either lossy or lossless and is designed with psychoacoustic or psychovisual parameters. That is to say, the signal is compressed to retain what is "humanly-perceptible." As long as the compression successfully mimics human perception, data space may be saved when the compressed file is compared to the uncompressed or original file. While psychoacoustic and psychovisual compression has some relevance to the present invention, additional data reduction or massive compression is anticipated by the present invention. It is anticipated that the original signal may be compressed to create a realistic or self-similar representation of the original signal, so that the compressed signal can be referenced at a subsequent time as unique binary data that has computational relevance to the original signal. Depending on the application, general data reduction of the original signal can be as simple as massive compression or may relate to the watermark encoding envelope parameter (those bits which a watermarking encoding algorithm deem as candidate bits for mapping independent data or those bits deemed imperceptible to human senses but detectable to a watermark detection algorithm). In this manner, certain media which are commonly known by signal characteristics, a painting, a song, a TV commercial, a dialect, etc., may be analyzed more accurately, and perhaps, more efficiently than a text-based descriptor of the signal. So long as the sender and receiver agree that the data representation is accurate, even insofar as the data-reduction technique has logical relationships with the perceptibility of the original signal, as they must with commonly agreed to text descriptors, no independent cataloging is necessary.

The present invention generally contemplates a signal recognition system that has at least five elements. The actual number of elements may vary depending on the number of domains in which a signal resides (for example, audio is at least one domain while visual carriers are at least two dimensional). The present invention contemplates that the number of elements will be sufficient to effectively and efficiently meet the demands of various classes of signal recognition. The design of the signal recognition that may be used with data reduction is better understood in the context of the general requirements of a pattern or signal recognition system.

The first element is the reference database, which contains information about a plurality of potential signals that will be monitored. In one form, the reference database would contain digital copies of original works of art as they are recorded by the various artists, for example, contain digital copies of all songs that will be played by a particular radio station. In another form, the reference database would contain not perfect digital copies of original works of art, but digital copies of abstracted works of art, for example, contain digital copies of all songs that have been preprocessed such that the copies represent the perceptual characteristics of the original songs. In another form, the reference database would contain digital copies of processed data files, which files represent works of art that have been preprocessed in such a fashion as to identify those perceptual differences that can differentiate one version of a work of art from another version of the same work of art, such as two or more versions of the same song, but by different artists. These examples have obvious application to visually communicated works such as images, trademarks or photographs, and video as well.

The second element is the object locator, which is able to segment a portion of a signal being monitored for analysis (i.e., the "monitored signal"). The segmented portion is also referred to as an "object." As such, the signal being monitored may be thought of comprising a set of objects. A song recording, for example, can be thought of as having a multitude of objects. The objects need not be of uniform length, size, or content, but merely be a sample of the signal being monitored. Visually communicated informational signals have related objects; color and size are examples.

The third element is the feature selector, which is able to analyze a selected object and identify perceptual features of the object that can be used to uniquely describe the selected object. Ideally, the feature selector can identify all, or nearly all, of the perceptual qualities of the object that differentiate it from a similarly selected object of other signals. Simply, a feature selector has a direct relationship with the perceptibility of features commonly observed. Counterfeiting is an activity which specifically seeks out features to misrepresent the authenticity of any given object. Highly granular, and arguably successful, counterfeiting is typically sought for objects that are easily recognizable and valuable, for example, currency, stamps, and trademarked or copyrighted works and objects that have value to a body politic.

The fourth element is the comparing device which is able to compare the selected object using the features selected by the feature selector to the plurality of signals in the reference database to identify which of the signals matches the monitored signal. Depending upon how the information of the plurality of signals is stored in the reference database and depending upon the available computational capacity (e.g., speed and efficiency), the exact nature of the comparison will vary. For example, the comparing device may compare the selected object directly to the signal information stored in the database. Alternatively, the comparing device may need to process the signal information stored in the database using input from the feature selector and then compare the selected object to the processed signal information. Alternatively, the comparing device may need to process the selected object using input from the feature selector and then compare the processed selected object to the signal information. Alternatively, the comparing device may need to process the signal information stored in the database using input from the feature selector, process the selected object using input from the feature selector, and then compare the processed selected object to the processed signal information.

The fifth element is the recorder which records information about the number of times a given signal is analyzed and detected. The recorder may comprise a database which keeps track of the number of times a song, image, or a movie has been played, or may generate a serial output which can be subsequently processed to determine the total number of times various signals have been detected.

Other elements may be added to the system or incorporated into the five elements identified above. For example, an error handler may be incorporated into the comparing device. If the comparing device identifies multiple signals which appear to contain the object being sought for analysis or monitoring, the error handler may offer further processing in order to identify additional qualities or features in the selected object such that only one of the set of captured signals is found to contain the further analyzed selected object that actually conforms with the object thought to have been transmitted or distributed.

Moreover, one or more of the five identified elements may be implemented with software that runs on the same processor, or which uses multiple processors. In addition, the elements may incorporate dynamic approaches that utilize stochastic, heuristic, or experience-based adjustments to refine the signal analysis being conducted within the system, including, for example, the signal analyses being performed within the feature selector and the comparing device. This additional analyses may be viewed as filters that are designed to meet the expectations of accuracy or speed for any intended application.

Since maintenance of original signal quality is not required by the present invention, increased efficiencies in processing and identification of signals can be achieved. The present invention concerns itself with perceptible relationships only to the extent that efficiencies can be achieved both in accuracy and speed with enabling logical relationships between an original signal and its abstract.

The challenge is to maximize the ability to sufficiently compress a signal to both retain its relationship with the original signal while reducing the data overhead to enable more efficient analysis, archiving and monitoring of these signals. In some cases, data reduction alone will not suffice: the sender and receiver must agree to the accuracy of the recognition. In other cases, agreement will actually depend on a third party who authored or created the signal in question. A digitized signal may have parameters to assist in establishing more accurate identification, for example, a "signal abstract" which naturally, or by agreement with the creator, the copyright owner or other interested parties, can be used to describe the original signal. By utilizing less than the original signal, a computationally inexpensive means of identification can be used. As long as a realistic set of conditions can be arrived at governing the relationship between a signal and its data reduced abstract, increases in effective monitoring and transparency of information data flow across communications channels is likely to result. This feature is significant in that it represents an improvement over how a digitally-sampled signal can be cataloged and identified, though the use of a means that is specifically selected based upon the strengths of a general computing device and the economic needs of a particular market for the digitized information data being monitored. The additional benefit is a more open means to uniformly catalog, analyze, and monitor signals. As well, such benefits can exist for third parties, who have a significant interest in the signal but are not the sender or receiver of said information.

As a general improvement over the art, the present invention incorporates what could best be described as "computer-acoustic" and "computer-visual" modeling, where the signal abstracts are created using data reduction techniques to determine the smallest amount of data, at least a single bit, which can represent and differentiate two digitized signal representations for a given predefined signal set. Each of such representations must have at least a one bit difference with all other members of the database to differentiate each such representation from the others in the database. The predefined signal set is the object being analyzed. The signal identifier/detector should receive its parameters from a database engine. The engine will identify those characteristics (for example, the differences) that can be used to distinguish one digital signal from all other digital signals that are stored in its collection. For those digital signals or objects which are seemingly identical, except[ing] that the signal may have different performance or utilization in the newly created object, benefits over additive or text-based identifiers are achieved. Additionally, decisions regarding the success or failure of an accurate detection of any given object may be flexibly implemented or changed to reflect market-based demands of the engine. Appropriate examples are songs or works or art which have been sampled or reproduced by others who are not the original creator.

In some cases, the engine will also consider the NULL case for a generalized item not in its database, or perhaps in situations where data objects may have collisions. For some applications, the NULL case is not necessary, thus making the whole system faster. For instance, databases which have fewer repetitions of objects or those systems which are intended to recognize signals with time constraints or capture all data objects. Greater efficiency in processing a relational database can be obtained because the rules for comparison are selected for the maximum efficiency of the processing hardware and/or software, whether or not the processing is based on psychoacoustic or psychovisual models. The benefits of massive data reduction, flexibility in constructing appropriate signal recognition protocols and incorporation of cryptographic techniques to further add accuracy and confidence in the system are clearly improvements over the art. For example, where the data reduced abstract needs to have further uniqueness, a hash or signature may be required. And for objects which have further uniqueness requirements, two identical instances of the object could be made unique with cryptographic techniques.

Accuracy in processing and identification may be increased by using one or more of the following fidelity evaluation functions:

1) RMS (root mean square). For example, a RMS function may be used to assist in determining the distance between data based on mathematically determinable Euclidean distance between the beginning and end data points (bits) of a particular signal carrier.

2) Frequency weighted RMS. For example, different weights may be applied to different frequency components of the carrier signal before using RMS. This selective weighting can assist in further distinguishing the distance between beginning and end points of the signal carrier (at a given point in time, described as bandwidth, or the number of total bits that can be transmitted per second) and may be considered to be the mathematical equivalent of passing a carrier signal difference through a data filter and figuring the average power in the output carrier.

3) Absolute error criteria, including particularly the NULL set (described above) The NULL may be utilized in two significant cases: First, in instances where the recognized, signal appears to be an identified object which is inaccurately attributed or identified to an object not handled by the database of objects; and second, where a collision of data occurs. For instance, if an artist releases a second performance of a previously recorded song, and the two performances are so similar that their differences are almost imperceptible, then the previously selected criteria may not be able to differentiate the two recordings. Hence, the database must be "recalibrated" to be able to differentiate these two versions. Similarly, if the system identifies not one, but two or more, matches for a particular search, then the database may need "recalibration" to further differentiate the two objects stored in the database.

4) Cognitive Identification. For example, the present invention may use an experience-based analysis within a recognition engine. Once such analysis may involve mathematically determining a spectral transform or its equivalent of the carrier signal. A spectral transform enables signal processing and should maintain, for certain applications, some cognitive or perceptual relationship with the original analog waveform. As a novel feature to the present invention, additional classes may be subject to humanly-perceptible observation. For instance, an experience-based criteria which relates particularly to the envisioned or perceived accuracy of the data information object as it is used or applied in a particular market, product, or implementation. This may include a short 3 second segment of a commercially available and recognizable song which is used for commercials to enable recognition of the good or service being marketed. The complete song is marketed as a separately valued object from the use of a discrete segment of the song (that may be used for promotion or marketing—for the complete song or for an entirely different good or service). To the extent that an owner of the song in question is able to further enable value through the licensing or agreement for use of a segment of the original signal, cognitive identification is a form of filtering to enable differentiations between different and intended uses of the same or subset of the same signal (object). The implementation relating specifically, as disclosed herein, to the predetermined identification or recognition means and/or any specified relationship with subsequent use of the identification means can be used to create a history as to how often a particular signal is misidentified, which history can then be used to optimize identification of that signal in the future. The difference between use of an excerpt of the song to promote a separate and distinct good or service and use of the excerpt to promote recognition of the song itself (for example, by the artist to sell copies of the song) relates informationally to a decision based on recognized and approved use of the song. Both the song and applications of the song in its entirety or as a subset are typically based on agreement by the creator and the sender who seeks to utilize the work. Trust in the means for identification, which can be weighted in the present invention (for example, by adjusting bit-addressable information), is an important factor in adjusting the monitoring or recognition features of the object or carrier signal, and by using any misidentification information, (including any experience-based or heuristic information), additional features of the monitored signal can be used to improve the performance of the monitoring system envisioned herein. The issue of central concern with cognitive identification is a greater understanding of the parameters by which any given object is to be analyzed. To the extent that a creator chooses varying and separate application of his object, those applications having a cognitive difference in a signal recognition sense (e.g., the whole or an excerpt), the system contemplated herein includes rules for governing the application of bit-addressable information to increase the accuracy of the database.

5) Finally, the predetermined parameters that are associated with a discrete case for any given object will have a significant impact upon the ability to accurately process and identify the signals. For example, if a song is transmitted over a FM carrier, then one skilled in the art will appreciate that the FM signal has a predetermined bandwidth which is different from the bandwidth of the original recording, and different even from song when played on an AM carrier, and different yet from a song played using an 8-bit Internet broadcast. Recognition of these differences, however, will permit the selection of an identification means which can be optimized for monitoring a FM broadcasted signal. In other words, the discreteness intended by the sender is limited and directed by the fidelity of the transmission means. Objects may be cataloged and assessing with the understanding that all monitoring will occur using a specific transmission fidelity. For example, a database may be optimized with the understanding that only AM broadcast signals will be monitored. For maximum efficiency, different data bases may be created for different transmission channels, e.g., AM broadcasts, FM broadcasts, Internet broadcasts, etc.

For more information on increasing efficiencies for information systems, see The Mathematical Theory of Communication (1948), by Shannon.

Because bandwidth (which in the digital domain is equated to the total number of bits that can be transmitted in a fixed period of time) is a limited resource which places limitations upon transmission capacity and information coding schemes, the importance of monitoring for information objects transmitted over any given channel must take into consideration the nature and utilization of a given channel. The supply and demand of bandwidth will have a dramatic impact on the transmission, and ultimately, upon the decision to monitor and recognize signals. A discussion of this is found in a application by the inventor under U.S. patent application Ser. No. 08/674,726 (which issued Apr. 22, 2008 as U.S. Pat. No. 7,362,775) "Exchange Mechanisms for Digital Information Packages with Bandwidth Securitization, Multichannel Digital Watermarks, and Key Management" (which application is incorporated herein by reference as if fully setforth herein).

If a filter is to be used in connection with the recognition or monitoring engine, it may be desirable for the filter to anticipate and take into consideration the following factors, which affect the economics of the transmission as they relate to triggers for payment and/or relate to events requiring audits of the objects which are being transmitted: 1) time of transmission (i.e., the point in time when the transmission occurred), including whether the transmission is of a live performance); 2) location of transmission (e.g., what channel was used for transmission, which usually determines the associated cost for usage of the transmission channel); 3) the point of origination of the transmission (which may be the same for a signal carrier over many distinct channels); and 4) pre-existence of the information carrier signal (pre-recorded or newly created information carrier signal, which may require differentiation in certain markets or instances).

In the case of predetermined carrier signals (those which have been recorded and stored for subsequent use), "positional information carrier signals" are contemplated by this invention, namely, perceptual differences between the seemingly "same" information carrier that can be recognized as consumers of information seek different versions or quality levels of the same carrier signal. Perceptual differences exist between a song and its reproduction from a CD, an AM radio, and an Internet broadcast. To the extent that the creator or consumer of the signal can define a difference in any of the four criteria above, means can be derived (and programmed for selectability) to recognize and distinguish these differences. It is, however, quite possible that the ability to monitor carrier signal transmission with these factors will increase the variety and richness of available carrier signals to existing communications channels. The differentiation between an absolute case for transmission of an object, which is a time dependent event, for instance a live or real time broadcast, versus the relative case, which is prerecorded or stored for transmission at a later point in time, creates recognizable differences for signal monitoring.

The monitoring and analysis contemplated by this invention may have a variety of purposes, including, for example, the following: to determine the number of times a song is broadcast on a particular radio broadcast or Internet site; to control security though a voice-activated security system; and to identify associations between a beginner's drawing and those of great artists (for example to draw comparisons between technique, compositions, or color schemes). None of these examples could be achieved with any significant degree of accuracy using a text-based analysis. Additionally, strictly text-based systems fail to fully capture the inherent value of the data recognition or monitoring information itself.

SAMPLE EMBODIMENTS

Sample Embodiment 1

A database of audio signals (e.g., songs) is stored or maintained by a radio station or Internet streaming company, who may select a subset of the songs are stored so that the subset may be later broadcast to listeners. The subset, for example, may comprise a sufficient number of songs to fill 24 hours of music programming (between 300 or 500 songs). Traditionally, monitoring is accomplished by embedding some identifier into the signal, or affixing the identifier to the signal, for later analysis and determination of royalty payments. Most of the traditional analysis is performed by actual persons who use play lists and other statistical approximations of audio play, including for example, data obtained through the manual (i.e., by persons) monitoring of a statistically significant sample of stations and transmission times so that an extrapolation may be made to a larger number of comparable markets.

The present invention creates a second database from the first database, wherein each of the stored audio signals in the first database is data reduced in a manner that is not likely to reflect the human perceptual quality of the signal, meaning that a significantly data-reduced signal is not likely to be played back and recognized as the original signal. As a result of the data reduction, the size of the second database (as measured in digital terms) is much smaller than the size of the first database, and is determined by the rate of compression. If, for example, if 24 hours worth of audio signals are compressed at a 10,000:1 compression rate, the reduced data could occupy a little more than 1 megabyte of data. With such a large compression rate, the data to be compared and/or analyzed may become computationally small such that computational speed and efficiency are significantly improved.

With greater compression rates, it is anticipated that similarity may exist between the data compressed abstractions of different analog signals (e.g., recordings by two different artists of the same song). The present invention contemplates the use of bit-addressable differences to distinguish between such cases. In applications where the data to be analyzed has higher value in some predetermined sense, cryptographic protocols, such as a hash or digital signature, can be used to distinguish such close cases.

In a preferred embodiment, the present invention may utilize a centralized database where copies of new recordings may be deposited to ensure that copyright owners, who authorize transmission or use of their recordings by others, can independently verify that the object is correctly monitored. The rules for the creator himself to enter his work would differ from a universally recognized number assigned by an independent authority (say, ISRC, ISBN for recordings and books respectively). Those skilled in the art of algorithmic information theory (AIT) can recognize that it is now possible to describe optimized use of binary data for content and functionality. The differences between objects must relate to decisions made by the user of the data, introducing subjective or cognitive decisions to the design of the contemplated invention as described above. To the extent that objects can have an optimized data size when compared with other objects for any given set of objects, the algorithms for data reduction would have predetermined flexibility directly related to computational efficiency and the set of objects to be monitored. The flexibility in having transparent determination of unique signal abstracts, as opposed to independent third party assignment, is likely to increase confidence in the monitoring effort by the owners of the original signals themselves. The prior art allows for no such transparency to the copyright creators.

Sample Embodiment 2

Another embodiment of the invention relates to visual images, which of course, involve at least two dimensions.

Similar to the goals of a psychoacoustic model, a psychovisual model attempts to represent a visual image with less data, and yet preserve those perceptual qualities that permit a human to recognize the original visual image. Using the very same techniques described above in connection with an audio signal, signal monitoring of visual images may be implemented.

One such application for monitoring and analyzing visual images involves a desire to find works of other artists that relate to a particular theme. For example, finding paintings of sunsets or sunrises. A traditional approach might involve a textual search involving a database wherein the works of other artists have been described in writing. The present invention, however, involves the scanning of an image involving a sun, compressing the data to its essential characteristics (i.e., those perceptual characteristics related to the sun) and then finding matches in a database of other visual images (stored as compressed or even uncompressed data). By studying the work of other artists using such techniques, a novice, for example, could learn much by comparing the presentations of a common theme by different artists.

Another useful application involving this type of monitoring and analyzing is the identification of photographs of potential suspects whose identity matches the sketch of a police artist.

Note that combinations of the monitoring techniques discussed above can be used for audio-visual monitoring, such as video-transmission by a television station or cable station. The techniques would have to compensate, for example, for a cable station that is broadcasting a audio channel unaccompanied by video.

Other embodiments and uses of the invention will be apparent to those skilled in the art from consideration of the specification and practice of the invention disclosed herein. The specification and examples should be considered exemplary only with the true scope and spirit of the invention indicated by the following claims. As will be easily understood by those of ordinary skill in the art, variations and modifications of each of the disclosed embodiments can be easily made within the scope of this invention as defined by the following claims.

The invention claimed is:

1. A system, comprising:
non transitory memory comprising a database for storing a plurality of digital reference signal abstracts;
at least one processor;
wherein said at least one processor is programmed or structured to generate a digital reference signal abstract from a digital reference signal such that said digital reference signal abstract is similar to said digital reference signal and reduced in size compared to said digital reference signal; and
wherein said at least one processor is programmed to store said digital reference signal abstract in said database as one of said plurality of digital reference signal abstracts;
wherein said non transitory memory further comprises a second database for storing a plurality of second database digital reference signal abstracts;
wherein said at least one processor is programmed or structured to generate a second database digital reference signal abstract from said digital reference signal such that said second database digital reference signal abstract is similar to said digital reference signal and reduced in size compared to said digital reference signal, and wherein said second database digital reference signal abstract is distinct from said digital reference signal abstract; and
wherein said at least one processor is programmed to store said second database digital reference signal abstract in said second database as one of said plurality of second database digital reference signal abstracts.

2. The system of claim 1, wherein said at least one processor is programmed or structured to generate said digital reference signal abstract from said digital reference signal by using perceptual qualities of said digital reference signal in generating said digital reference signal abstract such that the abstract retains a perceptual relationship to said digital reference signal.

3. The system of claim 1 wherein said at least one processor is programmed or structured to generate a digital reference signal abstract from a digital reference signal such that said digital reference signal abstract is self similar to said digital reference signal.

4. The system of claim 1, wherein said at least one processor is programmed or structured to select criteria to use for generating said digital reference signal abstract from said digital reference signal.

5. The system of claim 1, wherein said at least one processor is programmed or structured to generate said digital query signal abstract from a digital query signal such that said digital query signal abstract is similar to said digital query signal and reduced in size compared to said digital query signal.

6. The system of claim 1, wherein said at least one processor is programmed to generate said digital reference signal abstract.

7. A system, comprising:
non transitory memory comprising a database for storing a plurality of digital reference signal abstracts;
at least one processor;
wherein said at least one processor is programmed or structured to generate a digital reference signal abstract from a digital reference signal such that said digital reference signal abstract is similar to said digital reference signal and reduced in size compared to said digital reference signal; and
wherein said at least one processor is programmed to store said digital reference signal abstract in said database as one of said plurality of digital reference signal abstracts;
wherein said at least one processor is programmed or structured to generate said digital reference signal abstract from said digital reference signal and at least one of a hash and a signature, so that each one of said plurality of digital reference signal abstracts in said database is distinct from one another.

8. A system, comprising:
non transitory memory comprising a database for storing a plurality of digital reference signal abstracts;
at least one processor;
wherein said at least one processor is programmed or structured to generate a digital reference signal abstract from a digital reference signal such that said digital reference signal abstract is similar to said digital reference signal and reduced in size compared to said digital reference signal; and
wherein said at least one processor is programmed to store said digital reference signal abstract in said database as one of said plurality of digital reference signal abstracts;
wherein said digital reference signal is a digital representation of one of a plurality of different versions of a visual work and a multimedia work, and wherein said at least one processor is programmed or structured to generate said digital reference signal abstract from said digital reference signal so that said digital reference signal comprises signal characteristic parameters that differentiate between said plurality of different versions of said visual work and said multimedia work.

9. A system, comprising:
non transitory memory comprising a database for storing a plurality of digital reference signal abstracts;
at least one processor;
wherein said at least one processor is programmed or structured to generate a digital reference signal abstract from a digital reference signal such that said digital reference signal abstract is similar to said digital reference signal and reduced in size compared to said digital reference signal; and
wherein said at least one processor is programmed to store said digital reference signal abstract in said database as one of said plurality of digital reference signal abstracts;
wherein said at least one processor is programmed or structured to determine if said digital reference signal abstract matches one of said plurality of digital reference signal abstracts stored in said database; and
wherein said processor is programmed to recalibrate said database in response to a determination that said digital reference signal abstract matches one of said plurality of digital reference signal abstracts stored in said database.

10. A system, comprising:
- non transitory memory comprising a database for storing a plurality of digital reference signal abstracts;
- at least one processor;
- wherein said at least one processor is programmed or structured to generate a digital reference signal abstract from a digital reference signal such that said digital reference signal abstract is similar to said digital reference signal and reduced in size compared to said digital reference signal; and
- wherein said at least one processor is programmed to store said digital reference signal abstract in said database as one of said plurality of digital reference signal abstracts;
- wherein said processor is programmed or structured to change selected criteria to use for generating said digital reference signal abstract from said digital reference signal when said at least one processor determines that said digital reference signal abstract matches one of said plurality of digital reference signal abstracts stored in said database.

11. A system, comprising:
- non transitory memory comprising a database for storing a plurality of digital reference signal abstracts;
- at least one processor;
- wherein said at least one processor is programmed or structured to generate a digital reference signal abstract from a digital reference signal such that said digital reference signal abstract is similar to said digital reference signal and reduced in size compared to said digital reference signal; and
- wherein said at least one processor is programmed to store said digital reference signal abstract in said database as one of said plurality of digital reference signal abstracts;
- wherein said at least one processor is programmed or structured to compare a digital query signal abstract to said plurality of digital reference signal abstracts stored in said database to generate a compare result.

12. The system of claim 11, wherein said compare result indicates no match between said digital query signal abstract to said plurality of digital reference signal abstracts stored in said database.

13. The system of claim 11, wherein said compare result indicates a match between said digital query signal abstract and a first digital reference signal abstracts of said plurality of digital reference signal abstracts stored in said database.

14. The system of claim 11, wherein said memory further defines a digital query signal abstract receipt recorder recording a number times said at least one processor receives said digital query signal abstract for comparison with said plurality of digital reference signal abstracts stored in said database.

15. The system of claim 11, wherein said memory further defines a first digital reference signal abstract match recorder recording a number of times said at least one processor determines a match between a digital query signal abstract and first digital reference signal abstract of said plurality of digital reference signal abstracts stored in said database.

16. The system of claim 12, wherein said at least one processor is programmed or structured to use an algorithm to generate said digital reference signal abstract from said digital reference signal; and wherein said at least one processor is programmed or structured to use said algorithm to generate said digital query signal abstract from said digital query signal.

17. A system, comprising:
- non transitory memory comprising a database for storing a plurality of digital reference signal abstracts;
- at least one processor;
- wherein said at least one processor is programmed or structured to generate a digital reference signal abstract from a digital reference signal such that said digital reference signal abstract is similar to said digital reference signal and reduced in size compared to said digital reference signal; and
- wherein said at least one processor is programmed to store said digital reference signal abstract in said database as one of said plurality of digital reference signal abstracts;
- wherein said wherein said at least one processor is programmed or structured to apply at least one of psycho-acoustic model and a psycho-visual model to generate said digital reference signal abstract from said digital reference signal.

18. A method, comprising:
- storing in non transitory memory a database for storing a plurality of digital reference signal abstracts;
- generating with at least one processor a digital reference signal abstract from a digital reference signal such that said digital reference signal abstract is similar to said digital reference signal and reduced in size compared to said digital reference signal; and
- storing with said at least one processor said digital reference signal abstract in said database as one of said plurality of digital reference signal abstracts;
- wherein said non transitory memory further comprises a second database for storing a plurality of second database digital reference signal abstracts;
- wherein said at least one processor is programmed or structured to generate a second database digital reference signal abstract from said digital reference signal such that said second database digital reference signal abstract is similar to said digital reference signal and reduced in size compared to said digital reference signal, and wherein said second database digital reference signal abstract is distinct from said digital reference signal abstract; and
- wherein said at least one processor is programmed to store said second database digital reference signal abstract in said second database as one of said plurality of second database digital reference signal abstracts.

19. A computer program product stored on non transitory memory media, which, when installed on a computer system having at least one processor and non transitory memory, causes said computer system to perform the steps comprising:
- storing in said non transitory memory a database for storing a plurality of digital reference signal abstracts;
- generating with said at least one processor a digital reference signal abstract from a digital reference signal such that said digital reference signal abstract is similar to said digital reference signal and reduced in size compared to said digital reference signal; and
- storing with said at least one processor said digital reference signal abstract in said database as one of said plurality of digital reference signal abstracts;
- wherein said non transitory memory further comprises a second database for storing a plurality of second database digital reference signal abstracts;
- wherein said at least one processor is programmed or structured to generate a second database digital reference signal abstract from said digital reference signal such that said second database digital reference signal abstract is similar to said digital reference signal and reduced in size compared to said digital reference signal, and wherein said second database digital reference signal abstract is distinct from said digital reference signal abstract; and
- wherein said at least one processor is programmed to store said second database digital reference signal abstract in said second database as one of said plurality of second database digital reference signal abstracts.

\* \* \* \* \*

UNITED STATES PATENT AND TRADEMARK OFFICE
CERTIFICATE OF CORRECTION

| | | |
|---|---|---|
| PATENT NO. | : 8,214,175 B2 | |
| APPLICATION NO. | : 13/035964 | |
| DATED | : July 3, 2012 | |
| INVENTOR(S) | : Moskowitz et al. | |

It is certified that error appears in the above-identified patent and that said Letters Patent is hereby corrected as shown below:

Column 18 lines 7-11 change "wherein said wherein said at least one processor is programmed or structured to apply at least one of psycho-acoustic model and a psycho-visual model to generate said digital reference signal abstract from said digital reference signal." to -- wherein said at least one processor is programmed or structured to apply at least one of psycho-acoustic model and a psycho-visual model to generate said digital reference signal abstract from said digital reference signal. --

Signed and Sealed this
Fourth Day of December, 2012

David J. Kappos
*Director of the United States Patent and Trademark Office*